United States Patent
Bilek et al.

(10) Patent No.: US 9,620,119 B2
(45) Date of Patent: Apr. 11, 2017

(54) SYSTEMS AND METHODS FOR CONVERTING TAXIWAY VOICE COMMANDS INTO TAXIWAY TEXTUAL COMMANDS

(71) Applicant: HONEYWELL INTERNATIONAL INC., Morristown, NJ (US)

(72) Inventors: Jan Bilek, Jihomoravsky kraj (CZ); Vaclav Pfeifer, Brno (CZ); Matej Dusik, Brno (CZ); Tomas Kralicek, Krasensko (CZ)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 13 days.

(21) Appl. No.: 14/497,897

(22) Filed: Sep. 26, 2014

(65) Prior Publication Data
US 2016/0093302 A1    Mar. 31, 2016

(51) Int. Cl.
| | |
|---|---|
| *G08G 5/00* | (2006.01) |
| *G10L 15/26* | (2006.01) |
| *G10L 21/10* | (2013.01) |
| *G10L 25/48* | (2013.01) |
| *G08G 5/06* | (2006.01) |
| *G10L 15/22* | (2006.01) |

(52) U.S. Cl.
CPC .......... *G10L 15/26* (2013.01); *G08G 5/0013* (2013.01); *G08G 5/065* (2013.01); *G10L 15/22* (2013.01); *G10L 21/10* (2013.01); *G10L 25/48* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 7,737,867 B2 | 6/2010 | Arthur et al. | |
| 7,912,592 B2 | 3/2011 | Komer et al. | |
| 8,635,009 B2 | 1/2014 | LaFon et al. | |
| 2007/0288129 A1 | 12/2007 | Komer et al. | |
| 2010/0027768 A1 | 2/2010 | Foskett | |

(Continued)

FOREIGN PATENT DOCUMENTS

| | | |
|---|---|---|
| CN | 103366606 A | 10/2013 |
| EP | 2355070 A2 | 8/2011 |

(Continued)

OTHER PUBLICATIONS

Machine Translation of JP2010211536, to Shiiba Kenji.*

(Continued)

*Primary Examiner* — John R Olszewski
*Assistant Examiner* — James M McPherson
(74) *Attorney, Agent, or Firm* — Lorenz & Kopf, LLP

(57) ABSTRACT

Systems and methods are provided for converting taxiway voice commands into taxiway textual commands. In various embodiments, the systems can comprise a radio receiver that is configured to receive the taxiway voice commands from an air traffic control center, a voice recognition processor coupled to the radio receiver that is configured to receive and convert the taxiway voice commands into the taxiway textual commands, and/or a taxiway clearance display coupled to the voice recognition processor that is configured to receive and display the taxiway textual commands.

14 Claims, 3 Drawing Sheets

(56) References Cited

U.S. PATENT DOCUMENTS

| | | | |
|---|---|---|---|
| 2011/0125503 A1* | 5/2011 | Dong .................. | G10L 15/22 704/275 |
| 2011/0130963 A1* | 6/2011 | Feyereisen ............ | G01C 23/00 701/455 |
| 2015/0228273 A1* | 8/2015 | Serban .................. | G10L 15/18 704/254 |

FOREIGN PATENT DOCUMENTS

| | | |
|---|---|---|
| JP | 2010211536 A | 9/2010 |
| WO | 2008/070374 A2 | 6/2008 |

OTHER PUBLICATIONS

Stottler, R. et al.; Intelligent Pilot Intent Analysis System Using Artificial Intelligence Techniques; Infotech@Aerospace 2012 Conference.
EP Search Report for Application No. 15186575.5-1803/3002743 dated May 30, 2016.

* cited by examiner

SYSTEMS AND METHODS FOR CONVERTING TAXIWAY VOICE COMMANDS INTO TAXIWAY TEXTUAL COMMANDS

TECHNICAL FIELD

The present invention generally relates to systems and methods for converting taxiway voice commands into taxiway textual commands, and more particularly relates to systems and methods for receiving taxiway voice commands from an air traffic control center and converting those commands into textual commands for safety and convenience.

BACKGROUND

Commands are frequently provided to pilots of aircraft by air traffic control ("ATC") centers. Commands are relatively standardized and do not typically vary much from airport to airport. Commands can include commands to alter course, commands to alter heading and/or speed, and the like. Thus, aircraft pilots may receive and comply with these commands to, for example, prevent collisions between taxiing aircraft and/or ensure that the aircraft will not collide with a taxiway object (e.g., an ground based vehicle, a building, and the like).

These commands are often provided in a voice format by one or more operators of an ATC center by way of a radio communication with a taxiing aircraft. Thus, a pilot of the aircraft may, particularly where a language barrier exists, misunderstand or ignore one or more commands. In addition, pilots, on receipt of a command, may be required to manually respond (e.g., alter course), and in some instances, pilot response time may be insufficient to prevent incident.

Hence, there is a need for systems and methods that facilitate pilot recognition of and compliance with ATC provided audible commands.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Systems and methods are provided for converting taxiway voice commands into taxiway textual commands. In various embodiments, the systems can comprise a radio receiver that is configured to receive the taxiway voice commands from an air traffic control center, a voice recognition processor coupled to the radio receiver that is configured to receive and convert the taxiway voice commands into the taxiway textual commands, and/or a taxiway clearance display coupled to the voice recognition processor that is configured to receive and display the taxiway textual commands.

Furthermore, other desirable features and characteristics of the [system/method] will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
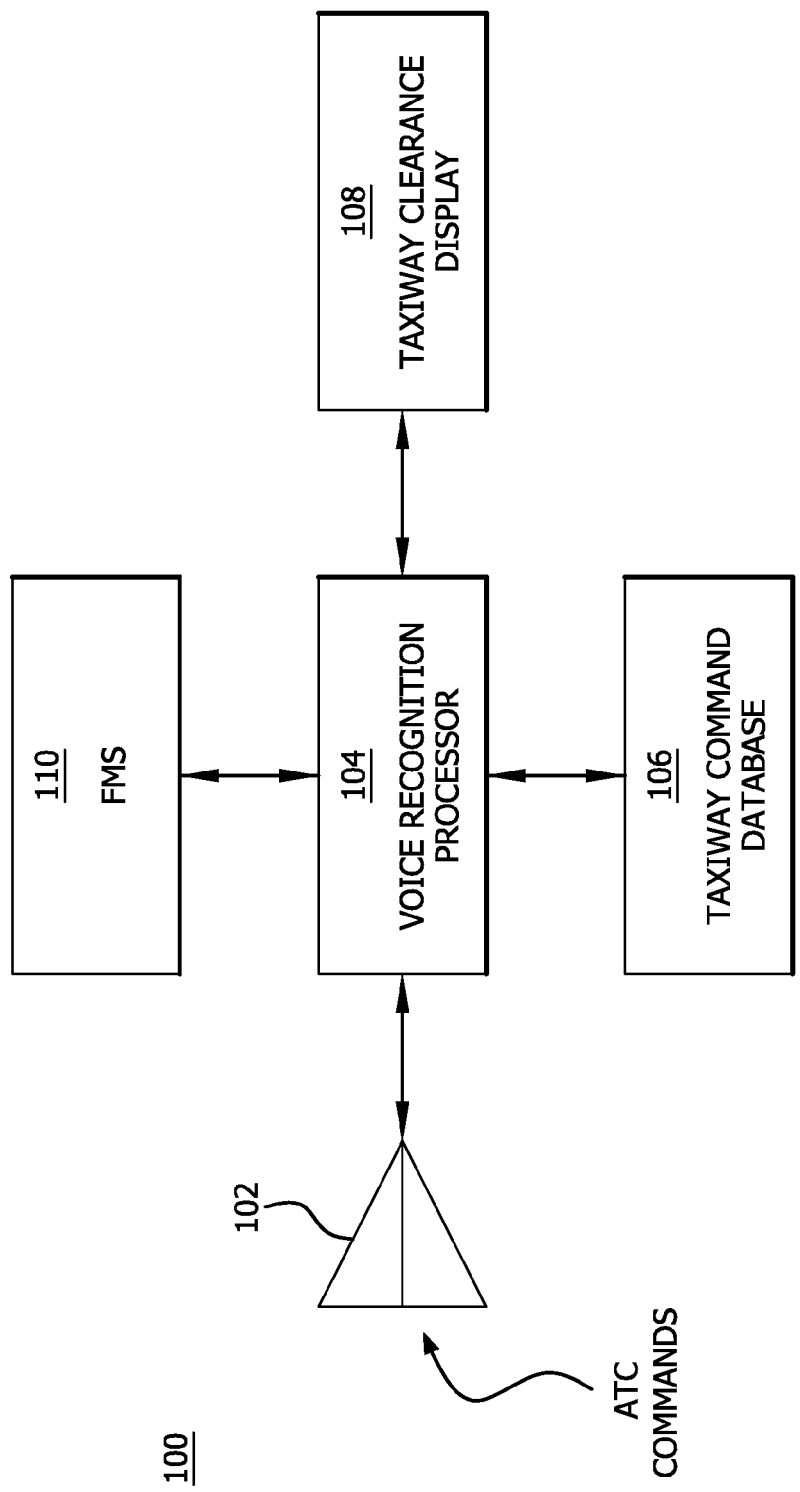
FIG. 1 illustrates, in accordance with various embodiments, a system for converting taxiway voice commands into taxiway textual commands.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

As described above, commands are frequently provided to pilots of aircraft by air traffic control ("ATC") centers. Commands are often provided while aircraft are located on a taxiway. Thus, commands may include information, such as, for example, information about a heading that an aircraft should take, a speed that the aircraft should assume, an upcoming obstacle, such as a ground based vehicle or other aircraft on a heading that, if uncorrected, may result in a collision, and the like. Thus, pilots rely on commands to safely pilot their aircraft.

Commands are relatively standardized and do not typically vary much from airport to airport. For instance, a command to adjust a heading at a first airport is frequently the same command that is used at a second airport.

However, conventionally, commands are transmitted to pilots via radio, and pilots receive commands audibly over a radio within the aircraft (or headset). Thus, as used herein, conventional commands may be referred to as "voice commands." As pilots travel large distances about the globe (and even about a particular country or region), and as languages, dialects, accents, and the like can vary greatly, pilots are often unable to interpret. It is for this reason that pilots may occasionally ignore or simply misunderstand an important command. In addition, pilots, even where the command is accurately interpreted, may find that it is too late to maneuver the aircraft as directed. Where this occurs, an aircraft collision or other undesirable incident may occur.

Systems and methods that increase pilot situational awareness and reaction time are therefore desirable. Accordingly, systems and methods for converting taxiway voice commands into taxiway textual commands are disclosed herein.

As used herein, a "taxiway textual command" may comprise any command this is or can be presented to or displayed for a pilot of an aircraft visually, rather than, or in addition to, audibly.

In various embodiments, such a system may comprise a radio that is configured to receive the taxiway voice commands from an air traffic control center, a voice recognition processor coupled to the radio that is configured to receive and convert the taxiway voice commands into taxiway textual commands, and/or a taxiway clearance display coupled to the voice recognition processor that is configured to receive and display the taxiway textual commands.

With reference now to FIG. 1, a system for converting taxiway voice commands into taxiway textual commands is shown. The system can comprise a radio receiver 102 that receives ATC commands, a voice recognition processor 104 that can be coupled to the radio receiver 102, a taxiway command database 106 that can be coupled to the voice recognition processor 104, a taxiway clearance display 108 that can be coupled to the voice recognition processor 104, and/or a flight management system ("FMS") 110 that can be coupled to the voice recognition processor 104.

In various embodiments, the taxiway command database 106 can comprise a tangible, non-transitory, computer-readable medium. The taxiway command database 106 can store pairs of taxiway voice commands with taxiway textual commands. In other words, the taxiway command database 106 can store associations between taxiway voice commands and taxiway textual commands. This can permit the voice recognition processor 104, as described below, to receive a taxiway voice command and, in response, locate the associated taxiway textual command.

Further, in various embodiments, the voice recognition processor 104 can comprise any computer processor(s) or computer-based system(s) configured to communicate with the taxiway command database 106 and/or convert taxiway voice commands into taxiway textual commands Similarly, in various embodiments, the FMS 110 can comprise any computer processor(s) or computer-based system(s) configured to assist in the management of a flight and/or taxiing procedure. Thus, in various embodiments, and as described herein, the FMS 110 can display an airport moving map, a taxiway clearance display, and/or any other information.

Figure 2:
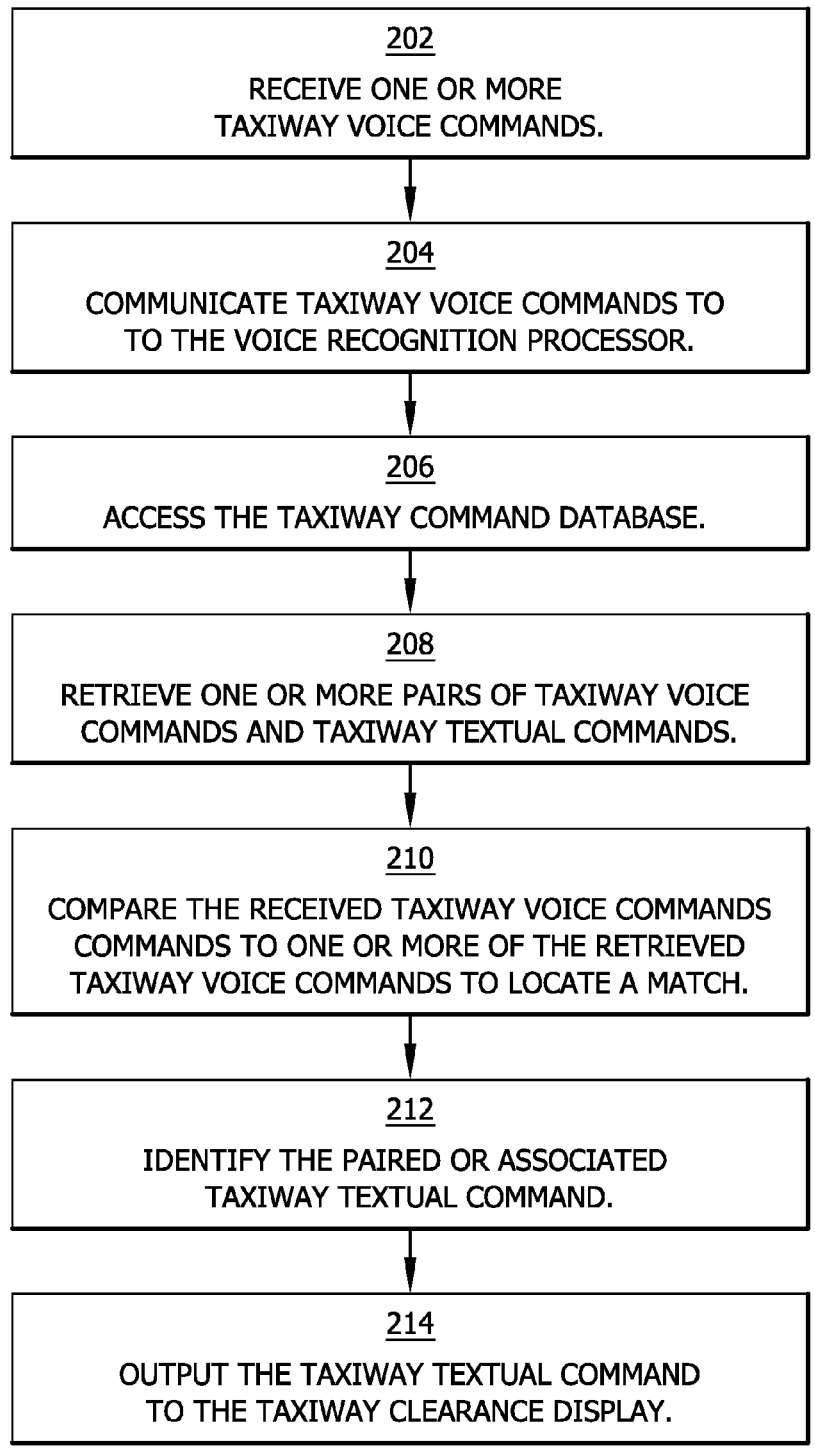
FIG. 2 illustrates, in accordance with various embodiments, a method for converting taxiway voice commands into taxiway textual commands.

Turning to FIG. 2, a process 200 for converting taxiway voice commands into taxiway textual commands is shown. In various embodiments, as shown, a radio receiver located on an aircraft can receive, from an ATC center, as described above, one or more taxiway voice commands (step 202). The taxiway voice commands can be communicated (e.g., over a network located within the aircraft) to the voice recognition processor 104 (step 204). The voice recognition processor 104 can, in various embodiments, communicate with or otherwise access the taxiway command database 106 (step 206) to retrieve one or more pairs of taxiway voice commands and taxiway textual commands (step 208).

As described briefly above, the voice recognition processor 104 can, in response, compare the received taxiway voice command to one or more of the retrieved taxiway voice command, and, using a speech recognition process or algorithm and/or by comparing the received taxiway voice command to one or more of the retrieved taxiway voice commands, locate a match (step 210). Having located a match, the voice recognition processor 104 can identify the paired or associated taxiway textual command (step 212). Thus, the received taxiway voice command can be converted to a taxiway textual command. Likewise, in various embodiments, a pilot voice command can be converted into a taxiway textual command as well, which can be communicated to ATC control and/or a copilot, for example. Thus, systems and methods described herein can reduce or eliminate any need for manual data input by a pilot, because a voice command can be received from a pilot (e.g., a pilot headset or microphone) and converted to a taxiway textual command that can be input, for example, to a flight management system, which system can interpret the command to send a control signal to an aircraft system or subsystem.

Figure 3A:
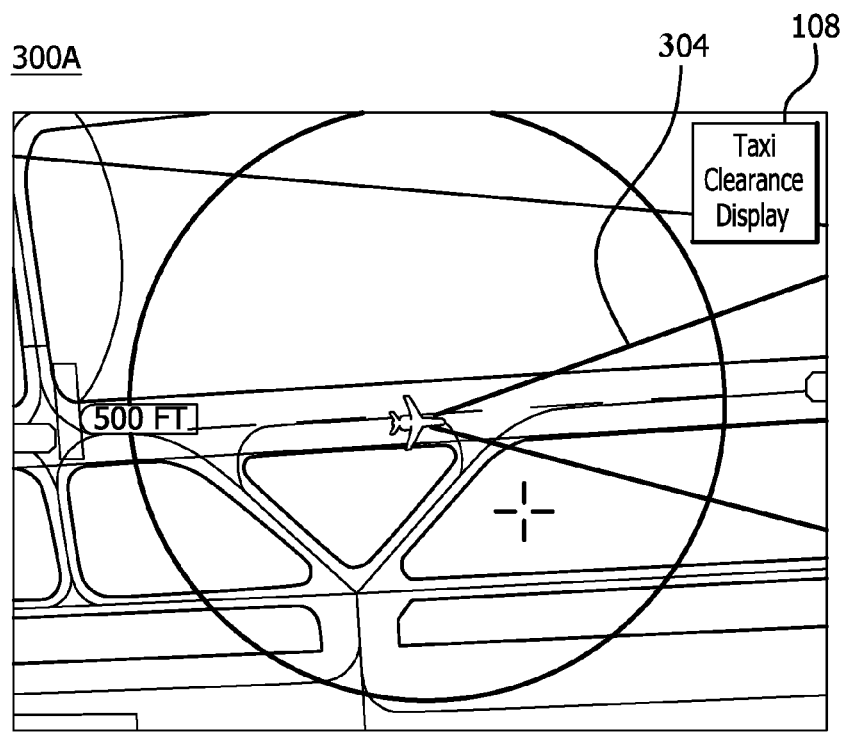
FIG. 3A illustrates, in accordance with various embodiments, a two-dimensional taxiway display that incorporates textual commands in the form of a taxiway clearance display.
Figure 3B:
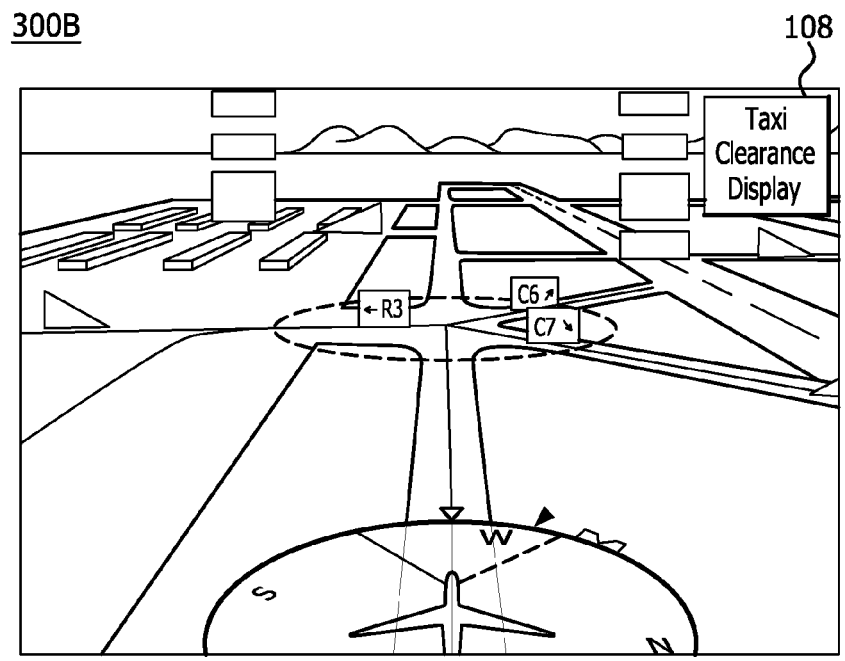
FIG. 3B illustrates, in accordance with various embodiments, a three-dimensional taxiway display that incorporates textual commands in the form of a taxiway clearance display.

The voice recognition processor 104 can, having completed the conversion to the taxiway textual command, output the taxiway textual command to the taxiway clearance display (step 214). For example, as shown with attention to FIGS. 3A and 3B, the voice recognition processor 104 can output the taxiway textual command to a taxiway clearance display, such as taxiway clearance display 108 and/or taxiway clearance display 304. Taxiway clearance displays 108 are example displays. Accordingly, the taxiway clearance displays 108 can be displayed in any manner that is convenient for a pilot. However, in various embodiments, and as shown with respect to FIGS. 3A and 3B, taxiway clearance displays 108 can be displayed within or overlaid on a two-dimensional airport moving map 300A and/or a three-dimensional airport moving map 300B. In various embodiments, a taxiway clearance display can also be displayed in text form, as a line map on an AMM, in the form of a verbal or other guidance command.

Continuing, in various embodiments, the voice recognition processor 104 can, in addition to outputting the taxiway textual command to a taxiway clearance display 108, communicate the taxiway textual command to the FMS 110, which can use the taxiway textual command to guide the aircraft (e.g., manage a taxiing procedure or portion thereof) according to the command. Further, in various embodiments, the taxiway textual command may not be displayed; rather, the command may simply be provided to the FMS 110.

In various embodiments, too, the voice recognition processor 104 can determine an uncertainty associated with the accuracy of the converted taxiway textual command. This may be accomplished in any of a variety of ways, including, for example, by determining a correlation between the received taxiway voice command and the taxiway voice command that is selected, as described above, as being a match for the received command. An uncertainty indicator (e.g., a value, a color of the taxiway textual command, and the like) may be associated with and/or displayed in the taxiway clearance display 108 for a pilot. Thus, a pilot may determine how accurate the pilot judges the converted taxiway textual command to be. In various embodiments, an uncertainty indicator can offer alternatives if the voice recognition processor 104 matches only part of a phrase or to an ATC voice command, as described herein, the voice recognition processor 104 can output a variety of possible taxiway textual commands, such that a pilot may select a correct or most probably, from the pilot's perspective, correct command. Moreover, in various embodiments, the system 100 can use AMM data to assess the probability, based upon the airport layout, that the taxiway textual command is correct.

Thus, the systems and methods disclosed herein can simplify and improve the operation of an aircraft on a taxiway.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for converting taxiway voice commands into taxiway textual commands, the system comprising:
    a radio receiver, the radio receiver configured to receive the taxiway voice commands from an air traffic control center;
    a voice recognition processor coupled to the radio receiver, the voice recognition processor configured to receive and convert the taxiway voice commands into the taxiway textual commands, determine an uncertainty associated with an accuracy of the converted taxiway textual commands based on the conversion of the taxiway voice commands, and determine an alternative taxiway textual command corresponding to each unconverted taxiway voice command based on the uncertainty; and
    a taxiway clearance display coupled to the voice recognition processor, the taxiway clearance display configured to receive and display the taxiway textual commands, the alternative taxiway textual commands when determined by the voice recognition processor, and an indication of the uncertainty.

2. The system of claim 1, further comprising a taxiway command database, the taxiway command database coupled to the voice recognition processor.

3. The system of claim 2, wherein the taxiway command database includes a plurality of common air traffic control center taxiway commands.

4. The system of claim 3, wherein the voice recognition processor compares the taxiway voice commands to the plurality of common air traffic control center taxiway commands to convert the taxiway voice commands into the taxiway textual commands.

5. The system of claim 1, further comprising a flight management system that receives the taxiway textual commands and processes the taxiway textual commands to manage a taxiing procedure.

6. The system of claim 1, wherein the taxiway clearance display is incorporated within a two-dimensional taxiway display.

7. The system of claim 1, wherein the taxiway clearance display is incorporated within a three-dimensional taxiway display.

8. The system of claim 6, wherein the two-dimensional taxiway display comprises an airport moving map.

9. The system of claim 7, wherein the three-dimensional taxiway display comprises an airport moving map.

10. A system for converting taxiway voice commands into taxiway textual commands, the system comprising:
a radio receiver, the radio receiver configured to receive the taxiway voice commands from an air traffic control center;
a taxiway command database, the taxiway command database including a plurality of common air traffic control center taxiway commands;
a voice recognition processor, the voice recognition processor coupled to the radio receiver and the taxiway command database, the voice recognition processor configured to receive the taxiway voice commands, the voice recognition processor further configured to compare the taxiway voice commands to the plurality of common air traffic control center taxiway commands and to convert the taxiway voice commands into the taxiway textual commands based on the comparison, determine an uncertainty associated with an accuracy of the converted taxiway textual commands based on the conversion of the taxiway voice commands, and determine an alternative taxiway textual command corresponding to each unconverted taxiway voice command based on the uncertainty; and
a taxiway clearance display coupled to the voice recognition processor, the taxiway clearance display configured to receive and display the taxiway textual commands, the alternative taxiway textual commands when determined by the voice recognition processor, and an indication of the uncertainty.

11. The system of claim 10, wherein the taxiway command database includes sounds associated with each of the plurality of common air traffic control center taxiway commands.

12. The system of claim 10, further comprising a flight management system that receives the taxiway textual commands and processes the taxiway textual commands to manage a taxiing procedure.

13. The system of claim 10, wherein the taxiway clearance display is incorporated within at least one of: a two-dimensional taxiway display and a three-dimensional taxiway display.

14. A method for converting taxiway voice commands into taxiway textual commands, the method comprising:
receiving, with a radio receiver, taxiway voice commands from an air traffic control center;
comparing, with a voice recognition processor, the taxiway voice commands to a plurality of common air traffic control center taxiway commands;
converting, with the voice recognition processor, the taxiway voice commands into the taxiway textual commands based on the comparison;
determining an uncertainty associated with an accuracy of the taxiway textual commands based on the conversion of the taxiway voice commands;
determining an alternative taxiway textual command corresponding to each unconverted taxiway voice command based on the uncertainty; and
displaying the taxiway textual commands, the alternative taxiway textual commands when determined by the voice recognition processor, and an indication of the uncertainty for a pilot of an aircraft.

* * * * *